United States Patent
Fandrich et al.

(10) Patent No.: US 6,467,791 B1
(45) Date of Patent: *Oct. 22, 2002

(54) UNDER-BED FIFTH WHEEL MOUNTING SYSTEM

(75) Inventors: Bernard Gust Fandrich, Lodi; Don Frederick Linger, Stockton, both of CA (US)

(73) Assignee: Valley Industries LLC, Lodi, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/723,105

(22) Filed: Nov. 27, 2000

Related U.S. Application Data (60) Provisional application No. 60/252,613, filed on Nov. 22, 2000.

(51) Int. Cl.[7] .................................................. B60D 1/52
(52) U.S. Cl. ..................................... 280/491.5; 280/901
(58) Field of Search ......................... 280/491.1, 491.5, 280/495, 433, 438.1, 901; 410/101, 102

(56) References Cited

U.S. PATENT DOCUMENTS

| | | |
|---|---|---|
| 3,941,407 A | 3/1976 | Breford |
| 4,029,335 A | 6/1977 | Cady et al. |
| 4,039,087 A | 8/1977 | Sandvick, Sr. |
| 4,856,804 A | 8/1989 | Nash |
| 4,960,288 A | 10/1990 | Chambers |
| 5,044,651 A | 9/1991 | Weikel |
| 5,104,138 A * | 4/1992 | Allen ........................... 280/433 |
| 5,306,037 A | 4/1994 | Robertson |
| 5,449,191 A | 9/1995 | Cattau |
| 5,472,222 A * | 12/1995 | Marcy ......................... 280/433 |
| 5,509,682 A | 4/1996 | Lindenman et al. |
| 5,516,137 A | 5/1996 | Kass et al. |
| 5,529,329 A | 6/1996 | McCoy |
| 5,580,073 A | 12/1996 | Irwin et al. |
| 5,707,070 A | 1/1998 | Lindenman et al. |
| 5,772,229 A | 6/1998 | Cattau |
| 5,839,745 A | 11/1998 | Cattau et al. |
| 6,065,766 A * | 5/2000 | Pulliam .................... 280/415.1 |
| 6,099,015 A * | 8/2000 | Marcy ......................... 280/433 |

FOREIGN PATENT DOCUMENTS

WO    WO 9108940 A1 *  6/1991    ........... B62D/53/08

* cited by examiner

*Primary Examiner*—Kevin Hurley
(74) *Attorney, Agent, or Firm*—Rader, Fishman &Grauer PLLC (57) ABSTRACT

An under-bed mounting system installed beneath a cargo bed floor of a vehicle includes both a male pin and a female receptacle. A releasable locking mechanism is defined between the pin and the receptacle to permit installation and removal of desired components such as a fifth wheel hitch. The pin including opposing first and second ends and an intermediate portion, a groove being disposed within said intermediate portion and including a stem and a base portion. A portion of the receptacle is received within said groove, selectively contacting said stem during installation and contacting at least the base portion after said installation. In one embodiment, the groove of the pin is generally L-shaped, the receptacle including a rod that is selectively received in the groove. In a second embodiment the pin is a scissor clamp with opposing jaws pivotable about a common hinge. The jaws engage the inner periphery of the receptacle.

22 Claims, 9 Drawing Sheets

Fig. 1

(PRIOR ART)

UNDER-BED FIFTH WHEEL MOUNTING SYSTEM

RELATED APPLICATIONS

The present invention claims priority from provisional patent application serial No. 60/252,613, filed on Nov. 22, 2000, the entire contents of which are incorporated by reference in their entirety.

BACKGROUND OF THE INVENTION

The present invention relates in general to an under-bed fifth wheel hitch mounting system used to removable secure items such as a fifth wheel hitch to a vehicle.

Fifth wheel and gooseneck hitch mounting systems are well known for use with the cargo bed area of pickup trucks and related vehicles. However, such mounting systems are typically bolted to the under frame of the vehicle through the use of essentially permanent fastener systems such as bolt and nut combinations, wherein the nut passes through the hitch mounting system, through the cargo bed area floor and into the under frame.

Such a permanent mounting system is highly undesirable. In particular, the hitch mounting system is typically not used on a regular basis, but only when towing a specialized trailer requiring such a system. A permanent mounting system greatly reduces the total cargo volume available for daily usage when the hitch is not required. Additionally, the mounting system is typically unsightly, reducing the ascetic appeal of the vehicle. Further, by having a permanent connection, corrosion can take place over time, making even a desired removal of a hitch nearly impossible.

Figure 1:
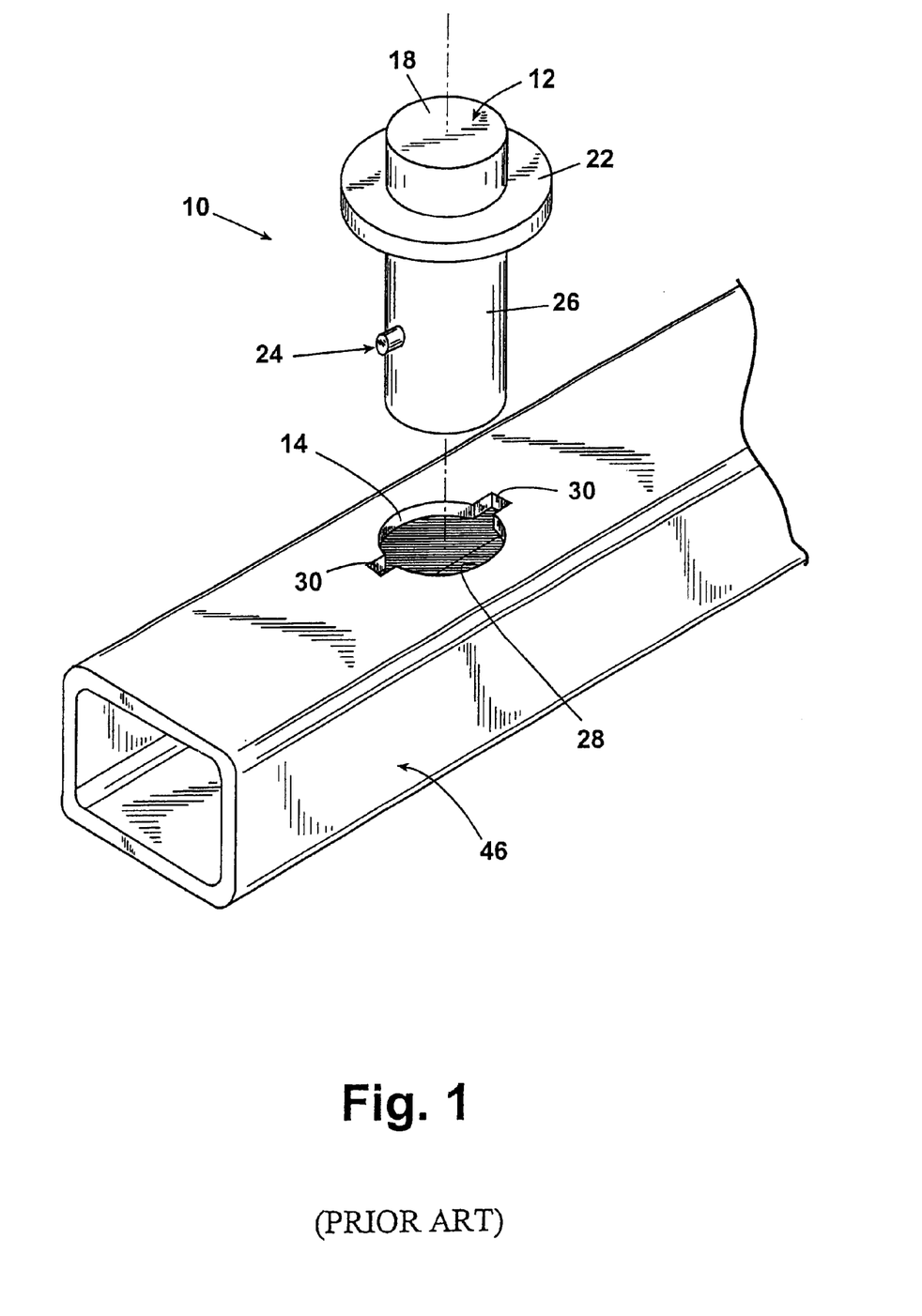
FIG. 1 is a perspective view of a prior art under-bed hitch mounting system.

To solve the problem of typical above-bed hitch mounting systems, an attempt has been made to develop an under-bed system 10 as illustrated in prior art FIG. 1. System 10 relies on the use of a solid cylindrical pin 12 received in a mating opening 14 provided in an under-bed tube 16 extending generally perpendicular to the longitudinal axis of the opening. Pin 12 includes opposed upper end 18 and lower end 20, a permanent washer 22 attached to pin 12 adjacent to upper end 18. A thin rod 24 extends perpendicularly from an outer surface 26 of the pin. Receptacle 14 includes a base portion 28 with two opposing channels 30 extending radially outwardly from the base portion 28, each of which are sized to receive rod 24 when pin 12 is properly positioned and inserted into receptacle 14. The pin is then twisted such that the rod 24 is no longer aligned with a channel 30.

In operation, the use of pin 12 is less than ideal. A key problem is noise since the pin has a tendency to move up and down during vehicle usage, resulting in a disconcerting and loud banging or rattling. Further, as the pin rattles, it exhibits an undesirable tendency to rotate, possibly resulting in the accidental alignment of the rod 24 with a channel 30. If such an alignment takes place, hitch-mounting components secured between pin 12 and under-bed tube 16 may be undesirably released. Finally, since the pin is free to move up and down, when sudden and heavy loads are applied, the pin may be moved at high speed towards the underside of tube 16, and could snap under the impact.

SUMMARY OF THE INVENTION

The disclosed invention is directed to an easily removable hitch locking mechanism comprising a male pin and a female receptacle. The receptacle and the necessary structure to support the receptacle are placed under the cargo bed floor of a vehicle. The receptacle is constructed such that when it is not in use, the cargo bed floor may be used in a traditional manner. However, when a fifth wheel hitch system or the like must be installed, the pins may be inserted through a component to be secured and inserted into a mating receptacle. The pin includes a groove comprising a stem and base such that when the pin is properly installed within the receptacle, it does not move longitudinally, laterally, or spin with respect to the receptacle unless purposely unlocked, thus providing a strong, rigid connection point for the secured component. The pin may be easily removed when the component is no longer required and the cargo bed returned to its normal operational status. When pins and mating receptacles are used, however, the resulting structure is very rigid and secure, providing appropriate loading support to secured components such as those comprising a fifth wheel hitch or a tie down. Moreover, the nature of the connection between the pins and receptacles eliminates undesirable noise even under changing or extreme load conditions.

A first embodiment of the invention is directed to a twistable lock pin. The pin includes a cone shaped first end and a pivotable handle at a second end. A center portion is disposed between the first end and the second end. A generally L-shaped groove is disposed along the outer circumference of the center portion. A stem of the groove intersects the first end and extends along the center portion to terminate at a base adjacent the second end. The base is generally perpendicular to the stem. However, in a preferred embodiment of the invention, the angle between the stem and the base is slightly greater than ninety degrees to promote a firm connection of the pin within its receptacle.

The receptacle of the first embodiment is a tubular socket including a rod extending from an inner periphery of the socket wall that matingly engages the groove stem. When the pin is properly inserted into the socket, the rod engages the groove stem, providing an entry path to the groove base. The handle of the lock pin is then rotated approximately a quarter turn to lock it in the socket, the rod moving up the base. Ideally, the positioning of the groove base with respect to the second end is selected such that the second end is at least closely adjacent to the upper surface of the socket. A notch may be used within the base to further help secure the rod within the base, the rod engaging the notch at a final locked position, thereby further minimizing the possibility of the pin undergoing unintentional rotation within a mating receptacle. To unlock the pin from the receptacle, the pin is raised or lowered, depending on the relative location of the notch. The longitudinal movement disengages the rod of the socket from the pin base, and then the pin is twisted toward an unlocked position. Alternatively or in addition to the use of a notch, the use of compressible elastomeric material between the pin and the receptacle may also be desirable to help provide appropriate biasing and a more secure connection for the component secured between the pin and the receptacle.

A second embodiment of the invention uses a different type of pin and receptacle combination acting as a locking mechanism to retain a component. However, the pin still includes a groove with a stem and a base that engages the receptacle. The pin is a scissor clamp with opposing jaws pivotable about a common hinge between an unlocked installation position and a locked component retention position. Each of the jaws includes a terminating end with a ledge acting as the base and a mating component portion at an opposite end. The stem of the groove is disposed between the base and the mating component portion. The receptacle receives the terminating end of the clamp, both the base and the stem engaging the receptacle to limit lateral, longitudinal, and rotational movements of the pin.

To prevent the clamp from improperly opening, an adjustable fastener such as a nut and bolt arrangement is illustrated. When the fastener is loosened, the clamp can be opened and closed. When the fastener is tightened, the clamp is secured in its closed position. Typically, using the adjustable fastener, one of the jaws moves with respect to the other jaw.

DETAILED DESCRIPTION OF PREFERRED EMBODIMENTS

The disclosed invention provides significant advantages over the prior art through the inventive locking mechanism comprising male pins and female receptacles. Receptacles and the necessary structure to support the receptacles are disposed under a cargo bed floor of a vehicle such that when the receptacles are not in use, the cargo bed floor may be used in a traditional manner. However, when a hitch system or the like must be installed, the inventive pins may be inserted through a component to be secured and inserted into the mating receptacle. The pin includes a groove comprising a stem and base such that when the pin is properly installed within the receptacle, it does not accidentally move longitudinally, laterally, or rotationally with respect to the receptacle, providing a strong, rigid connection point for the secured component. The pin may be easily removed when the component is no longer required and the cargo bed returned to its normal operational status.

Figure 2:
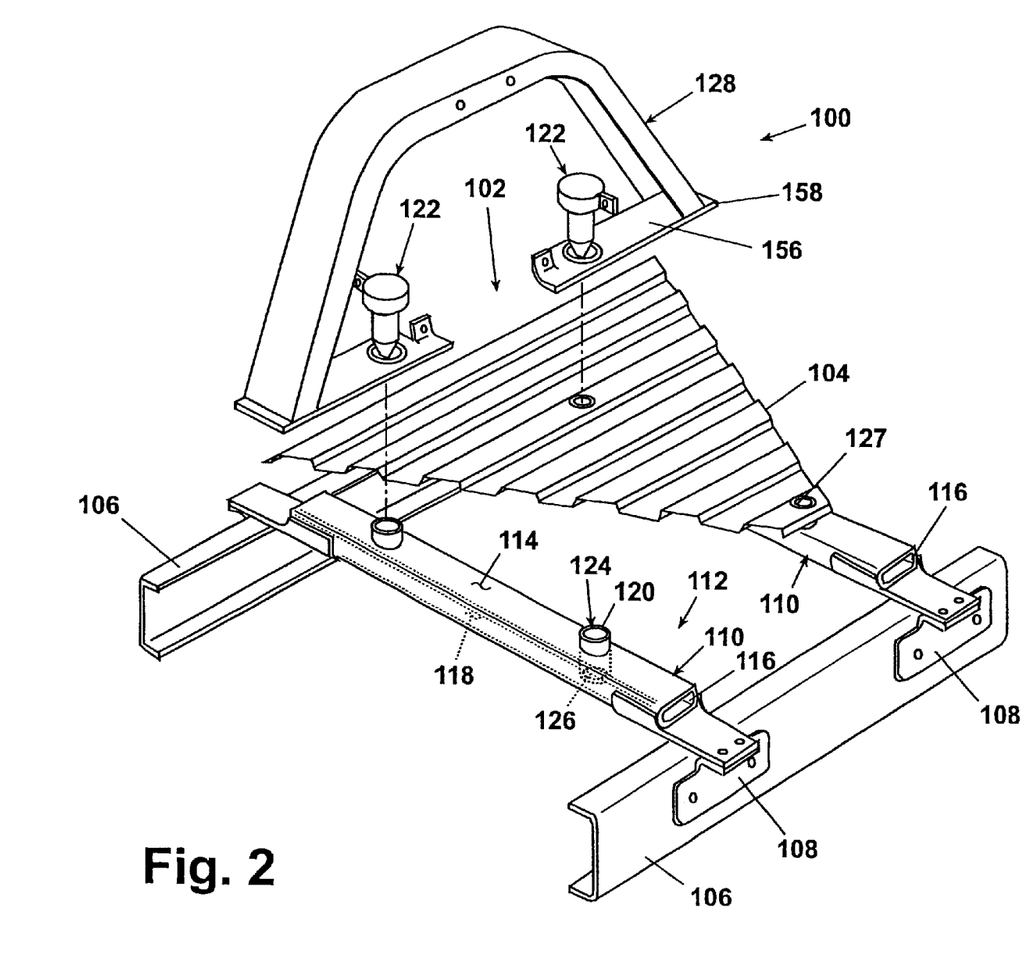
FIG. 2 is a perspective view of an under-bed hitch mounting system according to a first embodiment of the invention.
Figure 3:
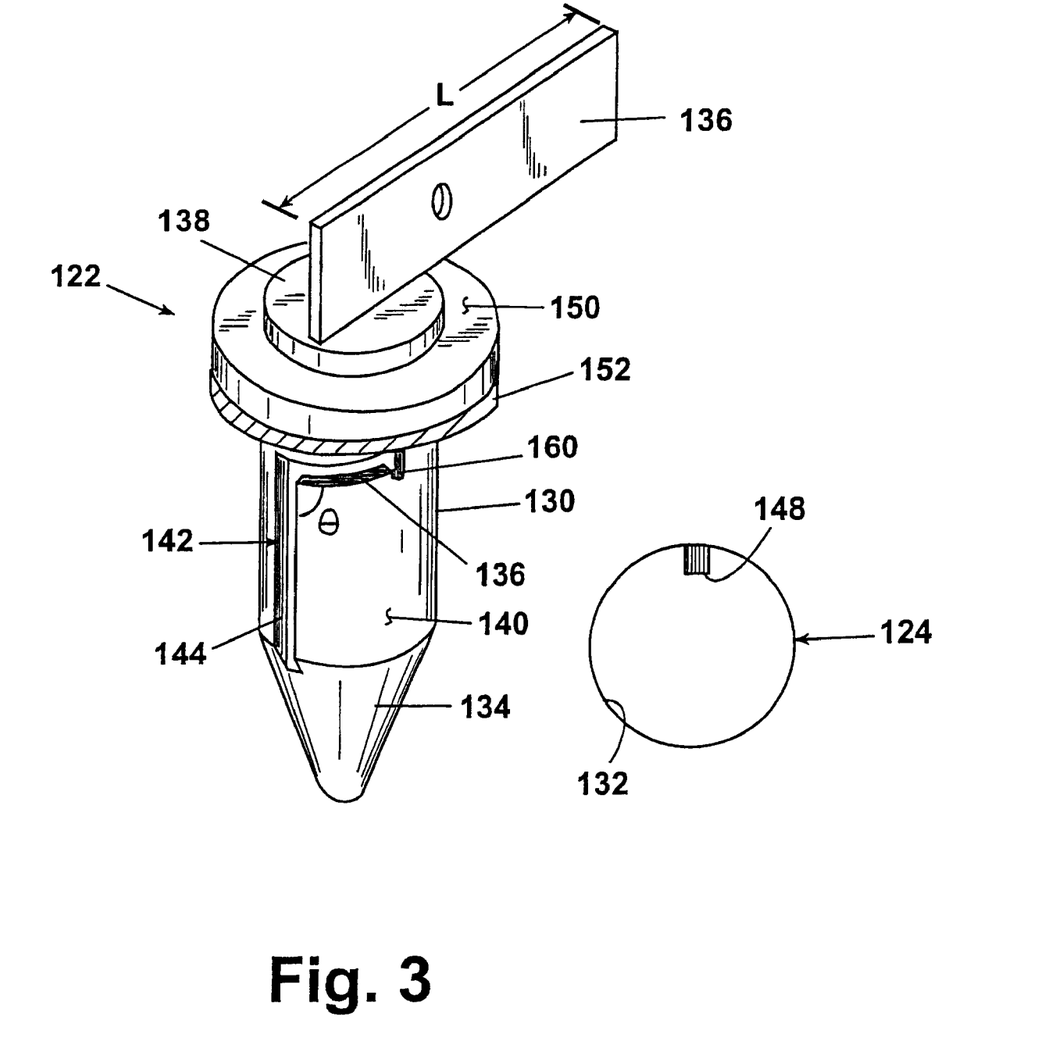
FIG. 3 is a perspective view of the tubular socket subassembly according to the first embodiment of the invention.

A first embodiment of the invention showing an under-bed fifth wheel hitch mounting system 100 is disclosed in FIGS. 2 and 3. System 100 is intended to be installed in a cargo bed area 102 of a utility vehicle such as a pickup truck. Area 102 includes a cargo bed floor 104, secured to two opposed and generally parallel cargo bed vehicle frames 106 forming an integral portion of the entire vehicle. In the illustrated embodiment, frames 106 are C-shaped. Permanently secured through the use of conventional fasteners or welding techniques are a plurality of frame brackets 108. Frame brackets 108 secure at opposite ends a generally hollow tube 110, rectangular in cross-section, and extending generally perpendicularly between frames 106. Two of tubes 110 are illustrated. Frames 106 and tubes 110 are each designed to withstand substantial tensile and compressive loading. They are preferably formed of a traditional iron-based material developed for heavy-duty vehicle use.

When two frames 106 and two tubes 110 are permanently secured in combination to form the generally rectangular structure as shown in FIG. 2, the resulting assembly 112 acts as a rigid support structure providing a secure foundation for vehicle hitch components as discussed below. In the illustrated embodiment, tubes 110 extend above frame brackets 106 with cargo bed floor 104 in turn secured to an upper wall 114 of each tube 110. If floor 104 is secured in a conventional manner to tubes 110 along their extent, additional rigidity is provided to assembly 112 so long as floor 104 is formed from a traditional metallic ribbed sheet of material. If yet additional rigidity is required for assembly 112, frames 106 and tubes 110 are preferably generally coplanar with floor 104 secured along the extent of each of the members within the confines of the generally rectangular structure.

Tubes 110 typically include a hollow interior 116 disposed between upper wall 114 and a lower wall 118. An opening 120 extends through upper wall 114 into hollow interior 116 to receive a mating pin 122, described in greater detail below. In a preferred embodiment, a socket 124 extends generally perpendicularly upwardly away from upper wall 114 of each tube 110. In another preferred embodiment, an aligned opening 126 is formed through lower wall 118. In a most preferred embodiment, socket 124 extends through openings 120 and 126 to form a strong and rigid receptacle to receive pin 118 that is restrained against lateral movement by the structure of assembly 112 and more locally by the inner periphery defined by openings 120 and 126. Typically, sockets 120 are welded or otherwise attached to tubes 110 in a conventional manner. Once assembly 112 is completed, sockets 124 extend at least partially through aligned openings 127 of floor 104, but preferably do not extend much if at all above floor 104. Otherwise, equipment sliding along floor 104 when pins 118 are not in use may catch upon and be damaged by sockets 124. Alternatively, the equipment may damage sockets 124.

Pins 122 and mating sockets 124 are used to secure conventional hitch components 128 to assembly 112. The spacing between tubes 110 is chosen to facilitate rigid securement of components 128 so that the load is distributed between multiple assembly members such as tube 110. In the illustrated embodiment a conventional upright of a fifth wheel hitch is illustrated. However, the invention may be used to secure any similar type of component, including for example, security chain tie downs for hitched trailer. When installing a tie down, typically only one member of assembly 112 will be utilized.

As best shown in FIG. 3, pin 122 and a mating socket 124 are complementary sized so that pin 122 may be easily received within socket 124. The relative dimensions of pin 122 and socket 124 are preferably selected so that pin 122 is easily received within the socket, but with a sufficiently tight tolerance so that banging between an outer wall 130 of the pin and inner socket wall 132 are minimized even when large lateral loads are exerted (e.g., in stop and go, or panic braking situations).

Pin 122 is generally cylindrical with a cone shaped first end 134 and a pivotable handle 136 at a second end 138. An advantage of having a cone shaped first end 134 is that it facilitates the insertion of pin 122 into socket 124. Handle 136 is generally perpendicular to the longitudinal axis defined by pin 122, and has a sufficient length L to provide substantial rotational torque when securing and loosening the pin from socket 124, as discussed in more detail below. Handle 136 maybe permanently or removably secured to pin end 138. An advantage of handle 136 being removably secured to pin end 138 is that it may provide additional security against theft to a fifth wheel hitch system mounted to assembly 112.

Pin 122 further includes a generally cylindrical center portion 140 located between the first end 134 and the second end 138. A generally L-shaped groove 142 is disposed along the outer circumference of center portion 140. A stem 144 of the groove intersects the first end 134 and extends upwardly along center portion 140 to terminate at a base 146 adjacent the second end 138. Base 146 extends generally perpendicular to the stem. However, in a preferred embodiment of the invention, an angle θ between the stem and the base is slightly greater than ninety degrees.

Socket 124 includes a rod 148 extending generally laterally away from socket wall 132, which is sized to matingly engage stem 144 of pin groove 142. Stem 144 is aligned with rod 148 and the pin dropped into socket 124. Stem 144 provides an entry path for pin 122 into socket 124 until socket rod 148 contacts pin groove base 146. Once rod 148 contacts base 146, handle 136 of the lock pin is then rotated approximately a quarter turn to lock it in the socket. Base 146 has a length L' sufficient about pin wall 130 to permit the approximately quarter turn of pin 122.

Adjacent to end 138 is a permanently secured rigid washer 150, preferably metallic in nature. In a preferred embodiment of the invention, a highly compressible material 152 is secured below rigid washer 150 immediately adjacent a terminating end 154 of base 146. Thus, as pin 122 is rotated such that rod 148 travels along base 146 toward terminating end 154, material 152 is compressed between washer 150 and an upper face 156 of component 128. In turn, an opposing lower face 158 of component 128 contacts floor 104. Once rod 148 reaches terminating end 154, in a preferred embodiment, it falls into a shallow notch 160. To unlock the pin from the receptacle, the pin 122 is raised or lowered, depending on the relative location of the notch 160. The longitudinal movement disengages the rod 148 of the socket 124 from the pin base 146, and then the pin is twisted toward an unlocked position. In the illustrated embodiment, pin 122 is slightly lifted before being twisted. If the notch is too deep then undesirable longitudinal based rattle may result.

Compressible material 152 provides several advantages. For example, since it is biased toward a non-compressed position, rod 148 is more securely maintained within base 146 and optional notch 160, when the notch is downwardly extending, against the biasing force of material 152. Further, biasing material 152 helps eliminate any longitudinal slack between rigid washer 150, component 128, and socket 124, minimizing unwanted noise. Additionally, a more weather resistant seal is provided.

To unlock pin 122 from socket 126, handle 136 is twisted in the opposite direction. Rod 148 becomes disengaged from optional notch 160 or terminating end 154 and the rod travels along the base toward stem 144. Once rod 148 reaches stem 144 material 152 is typically in its non-compressed state and pin 128 is easily retracted from socket 124.

Figure 4:
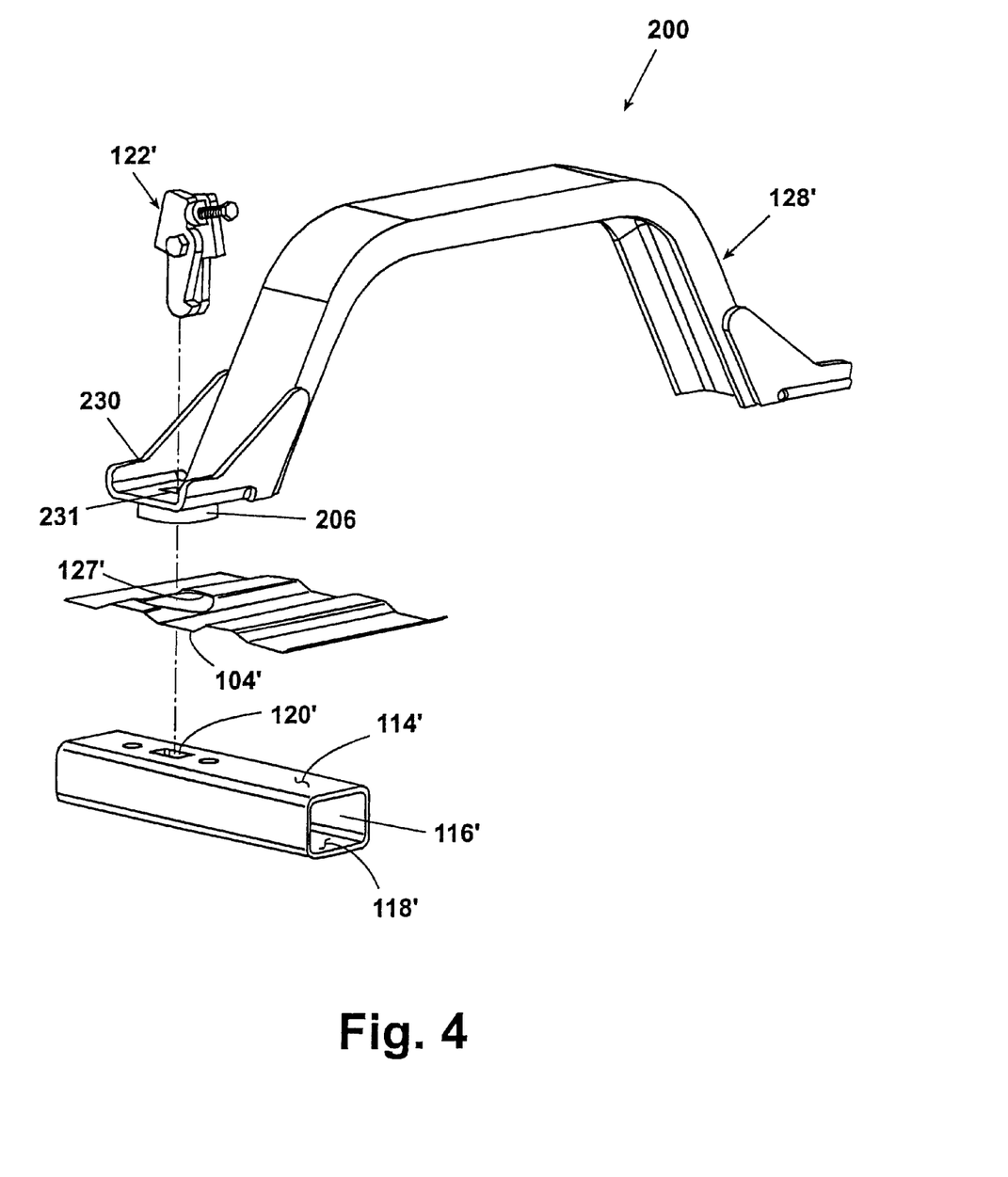
FIG. 4 is an exploded perspective view of a second embodiment of the invention.
Figure 5:
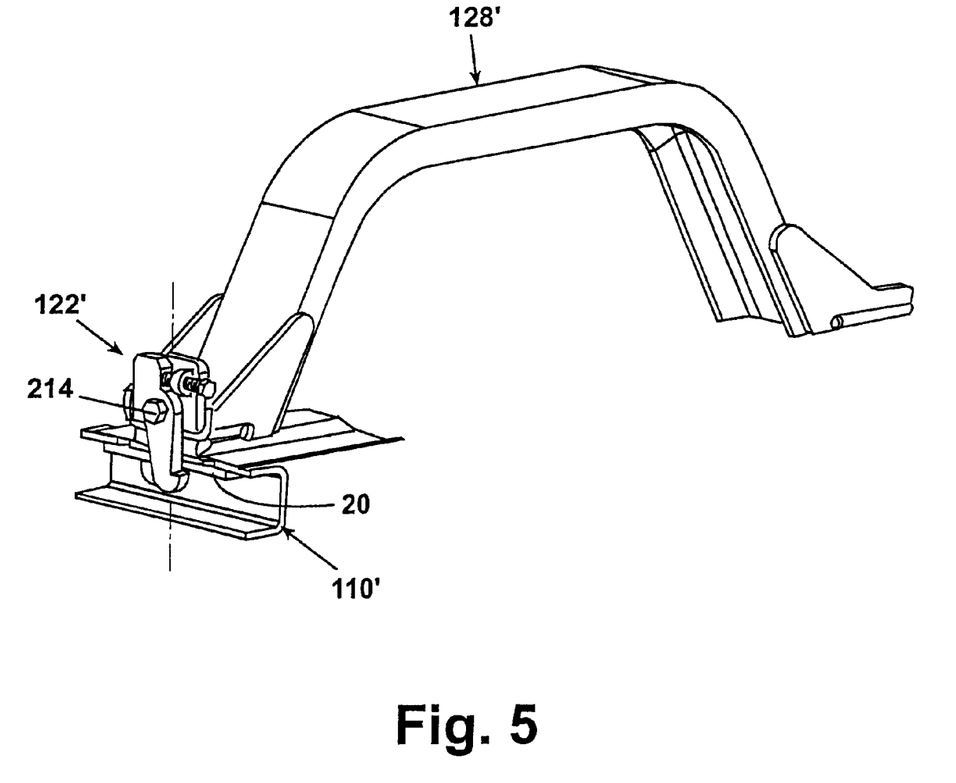
FIG. 5 is a perspective view of the second embodiment once the pin is installed in its mating receptacle.
Figure 6:
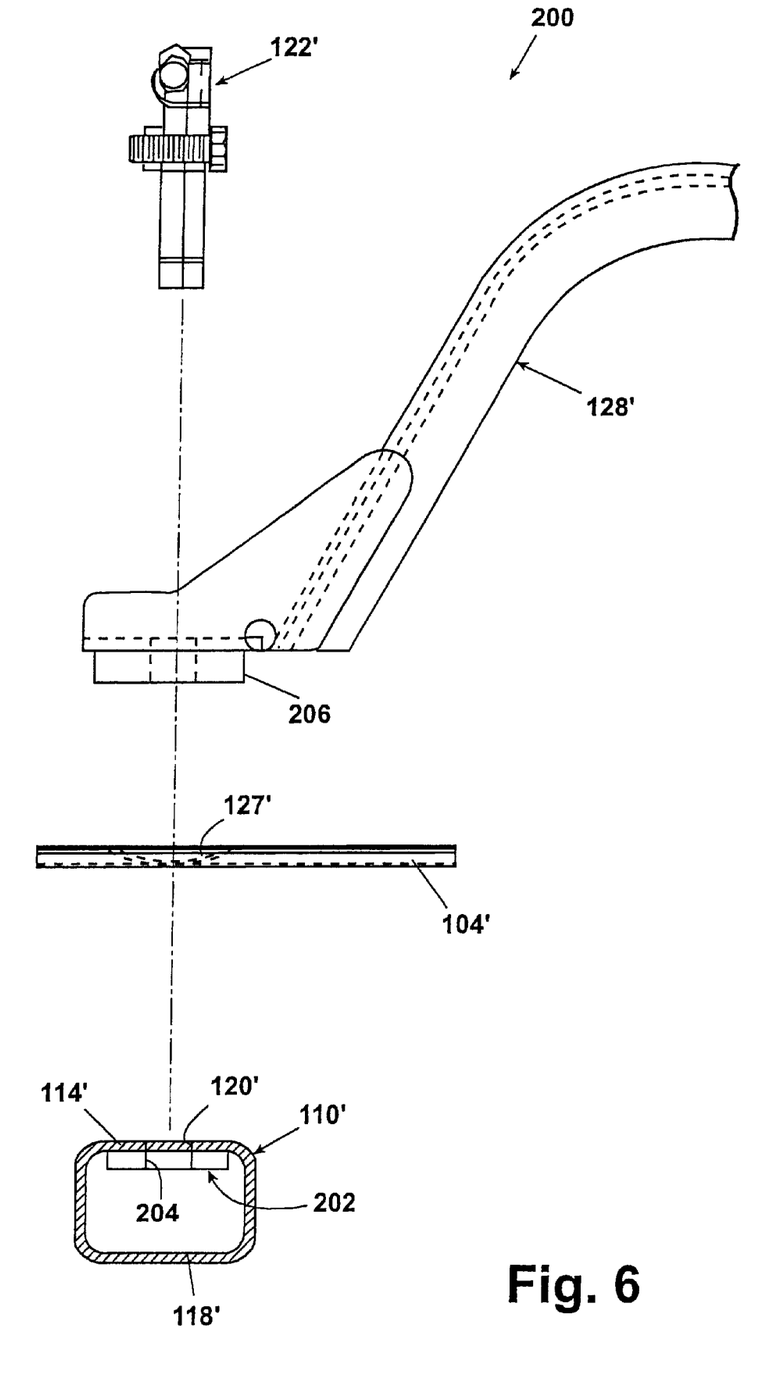
FIG. 6 is an exploded side view of the second embodiment.
Figure 7:
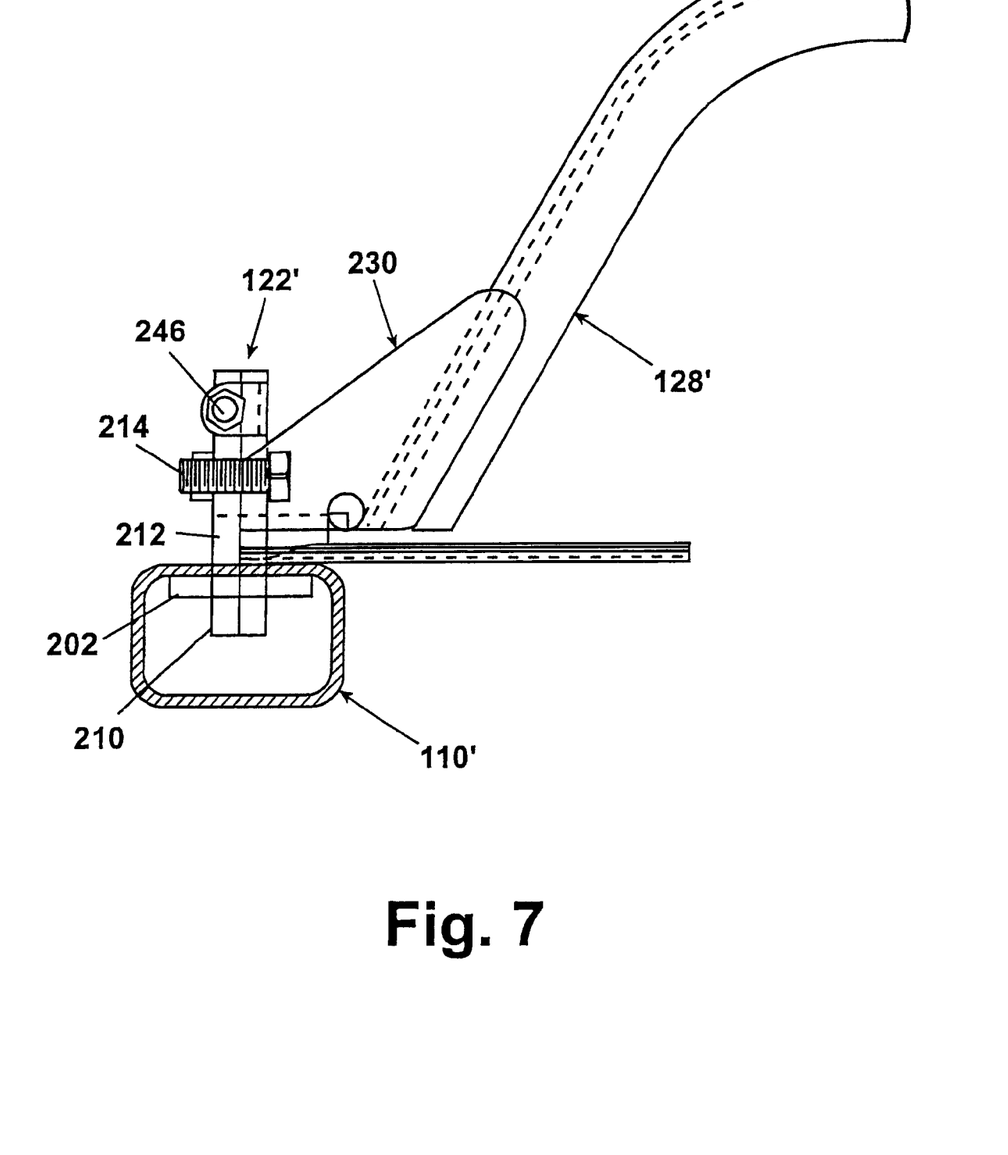
FIG. 7 is a side view of the second embodiment once the pin is installed in its mating receptacle.
Figure 8:
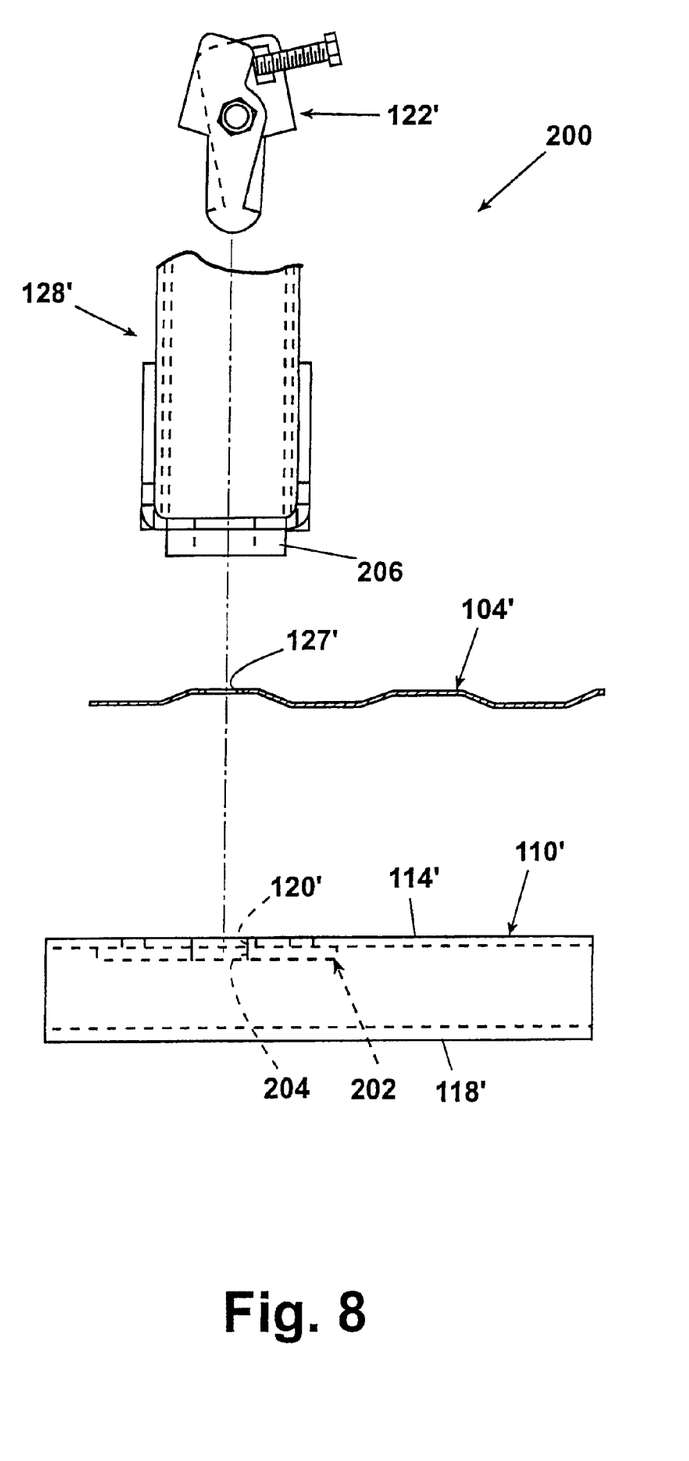
FIG. 8 is an exploded front view of the second embodiment.
Figure 9:
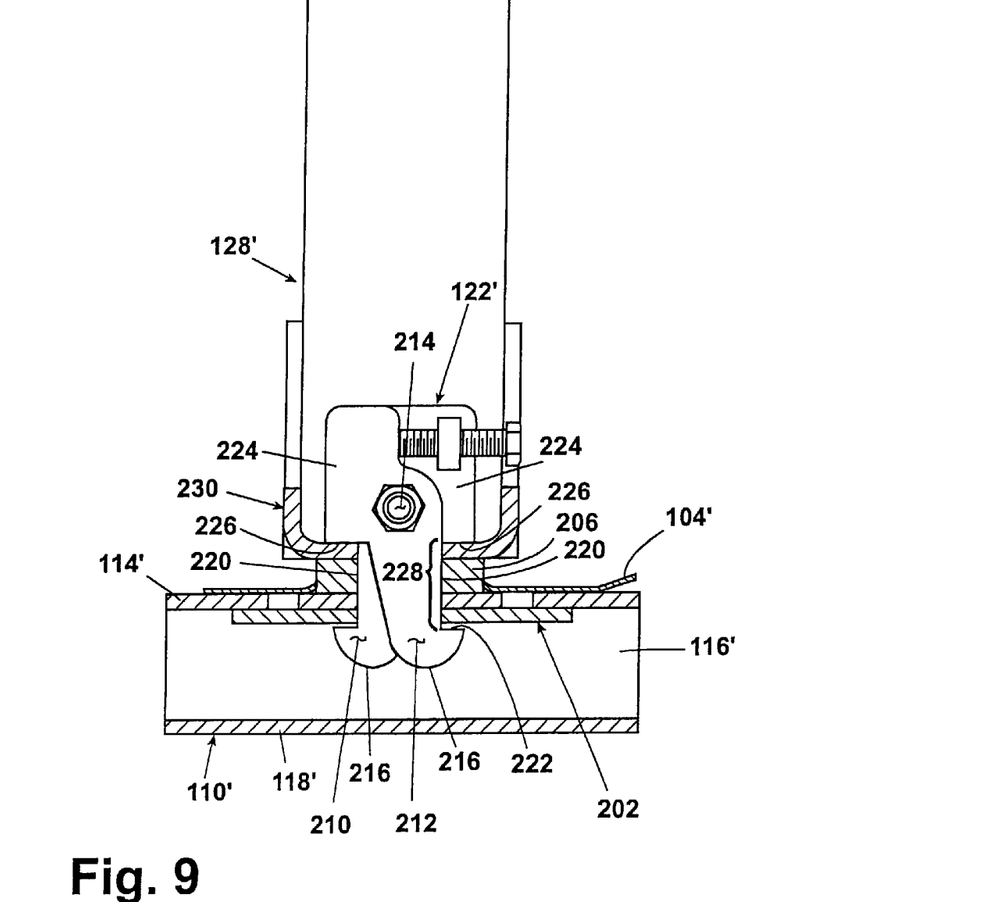
FIGS. 9 and 9A is a side view of the second embodiment once the pin is installed in its mating receptacle.

An alternative embodiment of the invention, showing an under-bed fifth wheel hitch mounting system 200 is disclosed in FIGS. 4 through 9. FIGS. 4 and 5 show a perspective view of system 200 in an exploded and then installed orientation. FIGS. 6 and 7 show a side view of system 200 in an exploded and then installed orientation. Finally, FIGS. 8 and 9 show a front view of system 200 in an exploded and then installed orientation, which FIG. 9A focusing on the pin structure.

The basic structure of floor 104' and tubes 110 remain unchanged between the embodiments as does the interrelationship between floor 104', frames 106, frame brackets 108 and tubes 110' to form assembly 112 as discussed in detail with respect to system 100. To facilitate the discussion that follows, elements are preferably identified using the same reference numbers as for system 100, but with an accent mark when there are differences between the two embodiments as noted.

A principal difference between the two embodiments relates to the nature of the openings 127' (shown for system 200) extending through floor 104' and the single opening 120' formed in an upper wall 114' of tubes 110' in combination to the lack of sockets 124. In contrast to the embodiment of system 100, system 200 takes advantage of the hollow interior 116 of cross tubes 110' to provide a clamping surface for pins 122', which comprises the interior face of upper wall 114' immediately adjacent the inner periphery comprising each opening 127'. In the illustrated embodiment, in view of the thin nature of truck bed floor 104', a reinforcement plate 202 has been added with its own complementary opening 204 aligned with opening 120' in interior 116 against an inner face of upper wall 114'. However, it may be preferable to place optional reinforcement plate against the outer face of upper wall 114'. Plate 202 is secured to tube 110' in any conventional manner including welding or the use of a mechanical fastener. The key purpose of reinforcement plate 202 is to provide additional rigidity to prevent undesirable deformation to tubes 110' adjacent openings 120' when pins 122' are in their installed position and significant loads are applied by way of hitch elements 128'.

In the illustrated embodiment of system 200, each hitch element 128' includes a simple male key portion 206 that corresponds to the shape of mating openings 127' and 120', but with a slightly smaller outer diameter so that the key portion may be readily received within either one or both of openings 127' and 120'. The key portion 206 helps with installation alignment and in the illustrated embodiment selectively engages an inner periphery of opening 127'. Opening 127' is shown larger than opening 120'. Key portion 206 is shown as being relatively thick in material cross-section such that its outer periphery is adjacent the inner periphery of opening 127' while its inner periphery is aligned with the inner periphery of opening 120' and optional opening 204. It is envisioned, however, that key portion 206 may optionally pass through all of the openings 127' and 120', and optional opening 204, to help distribute induced lateral loads upon hitch element 128' as it selectively engages the inner periphery of its mated, to limit lateral movement. However, the longitudinal extent of key portion 206 is no greater than the combined thickness of floor 104, upper wall 114' and optional reinforcement plate 202.

Figure 9A:
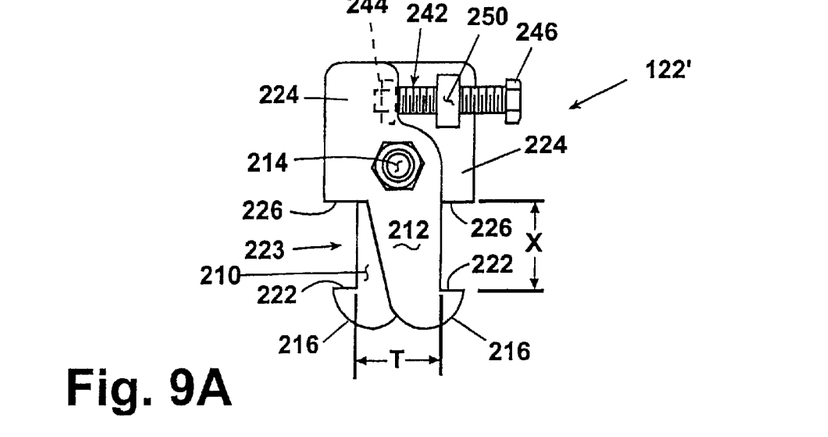

Pin 122' is a scissor clamp with opposing jaws 210 and 212 pivotable about a hinge 214. Jaws 210 and 212 each terminate at a lower end portion 216. Jaws 210 and 212 each include an upper end discussed below. End portion 216 is preferably arcuate to facilitate entry of pin 122' into openings 127' and 120', and optional opening 204. The end portion may contact the inner periphery of the combined opening and continue into hollow interior 116 of tube 110'. An outer portion of each jaw comprises an attachment mechanism in the form of a jaw stem wall 220 and a laterally outwardly extending ledge in the form of base 222 that together define a groove 223. In the illustrated embodiment, at least one of and preferably both of jaws 110 and 112 are integral with or rigidly connected to a corresponding rigid component mating portion 224 disposed at the opposite end of pin 122' away from terminating end 216, and defining an opposing end of stem wall 220. Each component mating portion 224 includes a bottom surface 226.

In practice, both base 222 and corresponding bottom surface 226 of component mating portion 224 are at generally approximately about a right angle with respect to intermediately disposed stem wall 220. However, the exact angle of base 222 and bottom surface 226 is optimized depending on the nature of the combined opening in which pin 122' is to be inserted. Preferably, when pin 122' is inserted into openings 127' and 120', and optional opening 204, and moved from a disengaged or open position to a fully engaged or closed position, the wall 220, base 222 and bottom surface 226 of each jaw firmly grip its mating elements firmly and with a maximum area of contact to improve both longitudinal and lateral securement loads between the openings and the component 128' while minimizing any potential relative rotation. The lateral extent of base 222 and bottom surface 226 may be adjusted to provide appropriate load distribution to avoid undesirable load concentrations that may damage tube 110' or the like. Yet, as noted below, the lateral extent must also be controlled so that the pin may in fact be inserted into opening 228 when pin 122' is in its open position.

In the illustrated embodiment, jaws 210 and 212 are generally identical to one another from at least bottom surface 226 to end 216. Moreover, the inner material dimensions of the elements to be secured by pin 122' are such that they define a combined opening defining receptacle 228 of system 200 with an inner periphery extending longitudinally in parallel with the axis defined by the opening. Thus, when pin 122' is locked in position, the walls of both jaws 210 and 212 are configured with respect to the size of the opening such that they are also parallel to the axis circumscribed by receptacle 228. Stem wall 220 of each jaw 210 and 212 contacts the combined inner periphery of receptacle 228 along substantially its entire extent. The distance X between base 222 and bottom surface 226 of each jaw is generally equivalent to the combined longitudinal extent of the elements to be secured, namely, optional plate 204, tube 110', key portion 206, and a base of a U-shaped bracket 230 with an aligned opening 231 of component 128' that helps to protect pin 122' from unwanted contact from cargo and the like. The combined lateral dimension T of jaws 210 and 212 when in the locked position is at least equal to and preferably slightly greater than the size of the opening to provide a robust level of lateral load contact between the pin 122' and the corresponding inner periphery of receptacle 228. When in a locked position, bottom surface 226 of each jaw is disposed above the base 222 of the other jaw. Thus, pin 122' provides both a longitudinal load and a lateral load between receptacle 228 and component 128' to provide an enhanced locking mechanism for system 200.

To move pin 122' between its locked and unlocked positions, a nut and bolt combination 240 is illustrated. However, any type of removable fastener that applies the appropriate loads upon pin 122' is acceptable. Bolt 242 includes a first end 244 secured to component mating portion 224 of jaw 210 with an integral or a separate nut 244 and a second end including a bolt head 246. Jaw 212 includes sleeve 250 rigidly connected to component mating portion 224 of jaw 212, sleeve 250 being disposed between nut 244 and bolt head 246. Thus, when bolt 248 is loosened or tightened with respect to sleeve 250, the pin may open and close by jaws 210 and 212 pivoting about hinge 214. In an open position, the pin 122' must have a sufficiently small lateral extent when opened that it can be fit into receptacle 228, but have a sufficiently large lateral extent when in its closed position that the various elements discussed above are securely locked in position. Of course, other types of opening and closing mechanism are acceptable so long as sufficient load is applied to appropriately lock pin 122' in position.

It is recognized that different embodiments of pin 122' are possible. For example, only one jaw may include component mating portion 224 with bottom surface 226. Thus, when pin 122' is inserted in the opening, that jaw can be immediately moved into engagement with the inner periphery of receptacle 228, the underside and upper surface of the receptacle is all disposed within groove 223. Then when the opposing jaw is moved into its engaged position, it grips the opposing underside and inner periphery of receptacle 228. The upper surface has already been secured by the other jaw bottom surface 226. Moreover, it is recognized that groove 223 may include one or more surfaces covered with an elastomeric material to provide beneficial biasing and noise reduction as noted above with respect to the embodiment of pin 122 and system 100. While opening 228 is illustrated as being generally rectangular, to help minimize twisting, any type of opening is acceptable so long as there is an underside surface for base 222 to grip. It may even be desirable to have pin 122' pass entirely through tube 110' and grip an outer face of lower wall 118' instead. Nor are systems 100 or 200 limited to engagement with tubes 110, 110'. Appropriate openings may be possible in frames 108.

The pins and receptacles are intended to be used in an outside environment. They must be able to engaged and disengaged at will. Therefore, it is envisioned that the pins and receptacles will include appropriate coatings and the like to avoid undesirable corrosion.

The disclosed embodiments and examples are given to illustrate the present invention. However, they are not meant to limit the scope and spirit of the present invention. Therefore, the present invention should be limited only by the appended claims.

What is claimed is:

1. An under-bed mounting system installed beneath a cargo bed floor of a vehicle, comprising:

a pin including first and second ends and an intermediate portion, a groove being disposed within said intermediate portion and including a stem and a base portion;

a receptacle, said receptacle having an upper end extending no greater than a cargo contact level of the cargo bed floor and a lower end extending below said cargo contact level of the cargo bed floor;

a locking mechanism defined between said pin and said receptacle to permit installation and removal of said pin from said receptacle, a portion of said receptacle being received within said groove and selectively contacting said stem during installation and contacting at least said base portion after said installation; and a component to be secured by said pin and receptacle, said component positioned between said pin and said receptacle during said installation, said first end of said pin received within said receptacle and said second end of said pin engaging said component.

2. An under-bed mounting system as recited in claim 1, further comprising an assembly for securing said receptacle to the vehicle, said assembly including a vehicle frame member comprising an integral part of said vehicle, and a cross member secured to said vehicle frame member, said cross member including an opening, said receptacle comprising a portion of said opening.

3. An under-bed mounting system as recited in claim 2, said cross member being tubular and having a hollow interior.

4. An under-bed mounting system as recited in claim 3, wherein a socket extends through said opening into said hollow interior of said cross member.

5. An under-bed mounting system as recited in claim 3, wherein a plate with a complementary opening is secured to and aligned with said cross member opening.

6. An under-bed mounting system as recited in claim 1, further comprising:

an assembly for securing said receptacle to the vehicle, said assembly including
two vehicle frame members comprising an integral part of said vehicle, and
a cross member secured between each of said frame members, said cross member being generally tubular and including a hollow interior, an upper wall of said cross member including an opening extending there through to said hollow interior, said opening comprising a portion of said receptacle.

7. An under-bed mounting system as recited in claim 1, wherein said pin is generally circular, said groove being generally L-shaped and disposed on an outer circumference of said intermediate portion, said stem of said groove intersecting said first end of said pin and extending along said intermediate portion, and said base portion being generally perpendicular to said stem and positioned adjacent to said second end of said pin, said receptacle including a tubular socket, said tubular socket adapted to receive said locking pin and including a pin engagement rod, said rod extending radially inwardly from an outer circumference of said socket to matingly engaged said groove of said pin.

8. An under-bed mounting system as recited in claim 7, wherein said angle between said groove stem and said groove base is greater than ninety degrees.

9. An under-bed mounting system as recited in claim 1, wherein when said pin is locked in said receptacle, said pin is unable to move longitudinally with respect to the axis circumscribed by said receptacle thereby minimizing noise during changing load conditions.

10. An under-bed mounting system as recited in claim 9, wherein an elastomeric material is disposed between said second end of said pin and said receptacle, said elastomeric material being compressed into a biased position as said pin is installed in said receptacle and locked in position.

11. An under-bed mounting system installed beneath a cargo bed floor of a vehicle comprising a locking pin, said locking pin including two opposing first and second ends and an intermediate portion, a generally L-shaped groove being disposed on an outer surface of said intermediate portion, a stem of said groove intersecting said first end and extending along said intermediate portion, and a base portion generally perpendicular to said stem being positioned adjacent to said second end; and a receptacle, said receptacle adapted to receive said locking pin and including a locking rod, said locking rod extending radially inwardly from a surface of said receptacle to matingly engage said groove of said pin, wherein said angle between said groove stem and said groove base is greater than ninety degrees.

12. An under-bed system as recited in claim 11, further comprising an assembly for securing said receptacle to the vehicle, said assembly including a vehicle frame member comprising an integral part of said vehicle, and a cross member with a hollow interior secured to said vehicle frame member, said cross member including an opening, said receptacle comprising a portion of said opening, said first end of said pin received in said hollow interior.

13. An under-bed system as recited in claim 12, wherein a socket extends through said opening into said hollow interior of said tubing, said locking rod extending away from a wall of said socket.

14. An under-bed mounting system, comprising:

a pin including first and second ends and an intermediate portion, a groove being disposed within said intermediate portion and including a stem and an a base portion;

a receptacle, said receptacle having an upper end extending no greater than a cargo contact level of the cargo bed floor and a lower end extending below said cargo contact level of the cargo bed floor;

a locking mechanism defined between said pin and said receptacle to permit installation and removal of said pin from said receptacle, a portion of said receptacle being received within said groove and selectively contacting said stem during installation and contacting at least said base portion after said installation; and an elastomeric material disposed between said second end of said pin and said receptacle, said elastomeric material being compressed into a biased position as said pin is installed in said receptacle and locked in position, wherein when said pin is locked in said receptacle, said pin is unable to move longitudinally with respect to the axis circumscribed by said receptacle, thereby minimizing noise during changing load conditions.

15. An under-bed mounting system as recited in claim 14, further comprising:

a component to be secured by said pin and receptacle, said component positioned between said pin and said receptacle during said installation, said first end of said pin received within said receptacle and said second end of said pin engaging said component.

16. An under-bed mounting system as recited in claim 14, further comprising an assembly for securing said receptacle to the vehicle, said assembly including a vehicle frame member comprising an integral part of said vehicle, and a cross member secured to said vehicle frame member, said cross member including an opening, said receptacle comprising a portion of said opening.

17. An under-bed mounting system as recited in claim 16, said cross member being tubular and having a hollow interior.

18. An under-bed mounting system as recited in claim 17, wherein a socket extends through said opening into said hollow interior of said cross member.

19. An under-bed mounting system as recited in claim 17, wherein a plate with a complementary opening is secured to and aligned with said cross member opening.

20. An under-bed mounting system as recited in claim 14, further comprising:

an assembly for securing said receptacle to the vehicle, said assembly including two vehicle frame members comprising an integral part of said vehicle, and a cross member secured between each of said frame members, said cross member being generally tubular and including a hollow interior, an upper wall of said cross member including an opening extending there through to said hollow interior, said opening comprising a portion of said receptacle.

21. An under-bed mounting system as recited in claim 14, wherein said pin is generally circular, said groove being generally L-shaped and disposed on an outer circumference of said intermediate portion, said stem of said groove intersecting said first end of said pin and extending along said intermediate portion, and said base portion being generally perpendicular to said stem and positioned adjacent to said second end of said pin, said receptacle including a tubular socket, said tubular socket adapted to receive said locking pin and including a pin engagement rod, said rod extending radially inwardly from an outer circumference of said socket to matingly engaged said groove of said pin.

22. An under-bed mounting system as recited in claim 21, wherein said angle between said groove stem and said groove base is greater than ninety degrees.

* * * * *